United States Patent
Alber

(10) Patent No.: US 10,016,958 B2
(45) Date of Patent: Jul. 10, 2018

(54) METHOD FOR MANUFACTURING SHEET METAL BLANKS, IN PARTICULAR HYBRID SHEET METAL BLANKS

(71) Applicant: WISCO Lasertechnik GmbH, Ravensburg (DE)

(72) Inventor: Gerhard Alber, Berg (DE)

(73) Assignee: Wisco Lasertechnik GmbH, Ravensburg (DE)

( * ) Notice: Subject to any disclaimer, the term of this patent is extended or adjusted under 35 U.S.C. 154(b) by 232 days.

(21) Appl. No.: 15/006,516

(22) Filed: Jan. 26, 2016

(65) Prior Publication Data

US 2016/0214162 A1 Jul. 28, 2016

(30) Foreign Application Priority Data

Jan. 27, 2015 (DE) .................. 10 2015 101 141

(51) Int. Cl.
*B23K 31/02* (2006.01)
*B32B 15/01* (2006.01)
*B23K 35/00* (2006.01)
*B23K 26/24* (2014.01)
(Continued)

(52) U.S. Cl.
CPC .............. *B32B 15/01* (2013.01); *B23K 26/24* (2013.01); *B23K 26/60* (2015.10); *B23K 35/001* (2013.01); *B23K 35/002* (2013.01); *B23K 35/004* (2013.01); *B32B 15/011* (2013.01);
(Continued)

(58) Field of Classification Search
CPC ........................ B23K 2203/00–2203/06; B23K 2203/18–2203/26; B23K 26/24–26/34; B23K 2201/185; B23K 2201/34; Y10T 403/477; Y10T 29/49826
See application file for complete search history.

(56) References Cited

U.S. PATENT DOCUMENTS 3,808,395 A * 4/1974 Bailey .................. B23K 15/04
219/121.14
4,527,040 A * 7/1985 Moon .................. B23K 35/304
219/118
(Continued)

FOREIGN PATENT DOCUMENTS

DE  10 2008 036 435 B4   8/2010
FR         2704469 A1 * 11/1994  .............. B23K 26/18
WO  WO 2011144808 A1 * 11/2011  ........... B23K 26/244

*Primary Examiner* — Jun Yoo
(74) *Attorney, Agent, or Firm* — Burr & Brown, PLLC

(57) ABSTRACT

Method for manufacturing sheet metal blanks, in particular hybrid sheet metal blanks, a first sheet metal part being manufactured from a first sheet metal part material, a second sheet metal part being manufactured from a second sheet metal part material, an elongate connecting sheet metal strip being provided, and the connecting sheet metal strip being connected along a first longitudinal edge to the first sheet metal part by a thermal joint, and the connecting sheet metal strip being connected along a second longitudinal edge to the second sheet metal part by means of a preferably thermal joint, characterized in that, in a first process step, the connecting sheet metal strip is connected to the first sheet metal part and, in a second process step, the connecting sheet metal strip is connected to the second sheet metal part, the first and the second process steps taking place within a production line.

13 Claims, 3 Drawing Sheets

(51) Int. Cl.
*B23K 26/60* (2014.01)
*B23K 103/20* (2006.01)
(52) U.S. Cl.
CPC .......... *B32B 15/012* (2013.01); *B32B 15/016* (2013.01); *B23K 2203/20* (2013.01)

(56) References Cited

U.S. PATENT DOCUMENTS

| | | | | |
|---|---|---|---|---|
| 6,479,168 | B2* | 11/2002 | Mazumder | B23K 35/004 |
| | | | | 148/525 |
| 7,138,598 | B2* | 11/2006 | Stevenson | B23K 9/0203 |
| | | | | 219/117.1 |
| 9,630,275 | B2* | 4/2017 | Chen | B23K 26/322 |
| 2012/0061453 | A1* | 3/2012 | Vogt | B23K 26/0846 |
| | | | | 228/160 |
| 2013/0193121 | A1* | 8/2013 | Alber | B23K 26/26 |
| | | | | 219/121.62 |
| 2014/0270922 | A1* | 9/2014 | Evangelista | B23K 9/0026 |
| | | | | 403/270 |
| 2016/0368094 | A1* | 12/2016 | Breuer | B23K 26/26 |
| 2017/0173734 | A1* | 6/2017 | Evangelista | B23K 9/235 |

\* cited by examiner

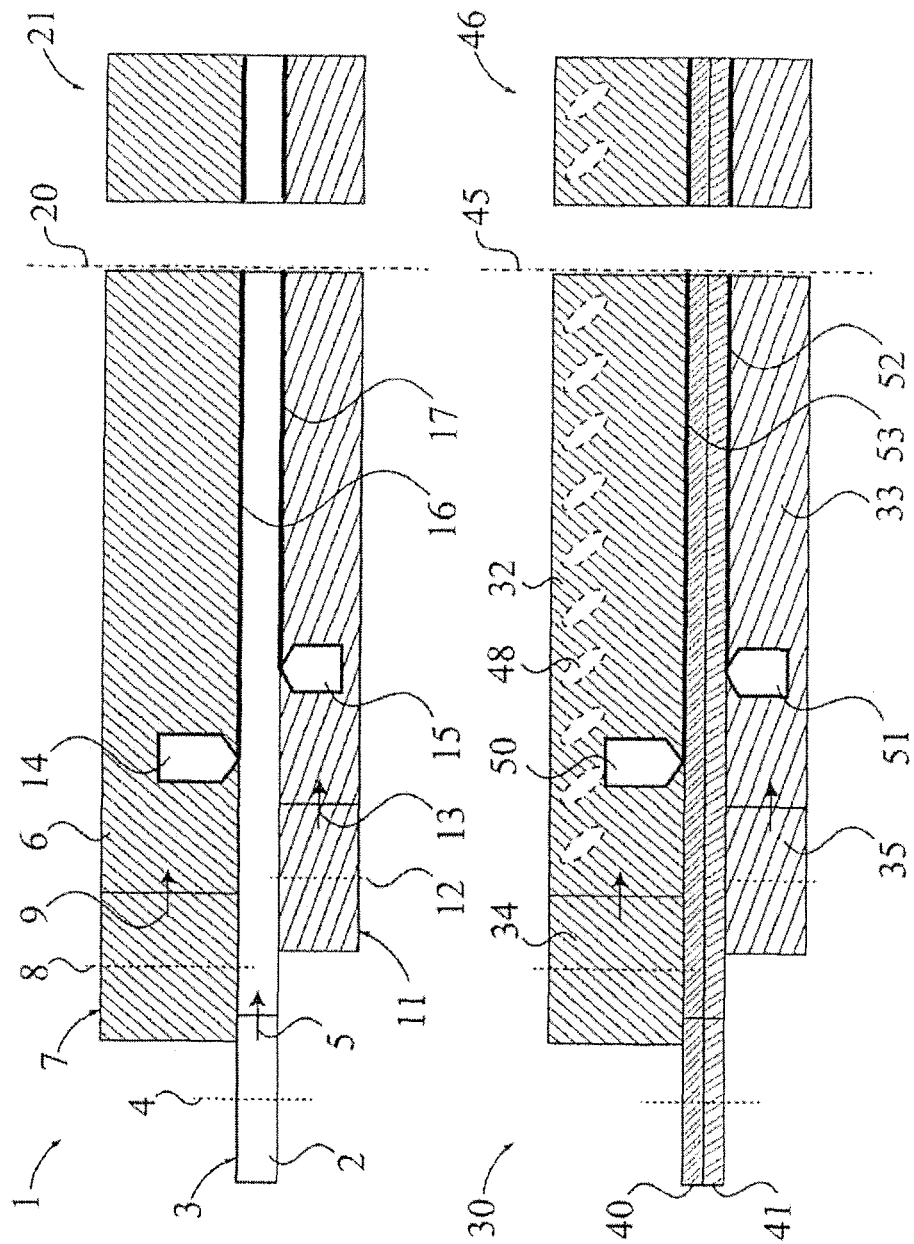

METHOD FOR MANUFACTURING SHEET METAL BLANKS, IN PARTICULAR HYBRID SHEET METAL BLANKS

This application claims the benefit under 35 USC § 119(a)-(d) of German Application No. 10 2015 101 141.7 filed Jan. 27, 2015, the entirety of which is incorporated herein by reference.

FIELD OF THE INVENTION

The present invention relates to a method for manufacturing sheet metal blanks, in particular, hybrid sheet metal blanks.

BACKGROUND OF THE INVENTION

In industrial applications, in particular, the automotive sector, ever-increasing requirements are being imposed for the combination of the most diverse materials. Sheet metal materials, in particular, have a considerable role to play in this respect. Combinations of light alloy and steel are not uncommon in this context, since different requirements are expected of the different component parts of a sheet metal blank, for example, in terms of its deformability and stability. The ability to connect together different sheet metal materials from different groups of materials, for example, steel and aluminum, albeit by no means straightforwardly, calls for the use of elaborate methods of connection, for example, riveting, crimping or overlapping with third materials, which involves additional processing, handling and, above all, material costs and space requirements.

Familiar from the prior art in DE 10 2008 036 435 B4 is a method for manufacturing a semi-finished material having the ability, as an endless hybrid strip, to connect together materials from different groups of materials. However, a disadvantage associated with the prior art is that an additional cost is involved in order to manufacture, cut to length and convey the semi-finished material for processing with further semi-finished materials.

SUMMARY OF THE INVENTION

The object of the present invention is thus to make available a method for manufacturing sheet metal blanks, in particular, hybrid sheet metal blanks, which is capable of being executed in a simplified and cost-effect manner and avoids additional handling costs.

The present invention relates to a method for manufacturing sheet metal blanks, in particular, hybrid sheet metal blanks, a first sheet metal part being manufactured from a first sheet metal part material, a second sheet metal part being manufactured from a second sheet metal part material, an elongate connecting sheet metal strip being provided, and the connecting sheet metal strip being connected along a first longitudinal edge to the first sheet metal part by means of a preferably thermal joint, and the connecting sheet metal strip being connected along a second longitudinal edge to the second sheet metal part by means of a preferably thermal joint.

The present invention is characterized in that in a first process step, the connecting sheet metal strip is connected along the first longitudinal edge to the first sheet metal part by means of a thermal or mechanical joint, in particular, by means of a laser welding process, and in a second process step, the connecting sheet metal strip is connected along the second longitudinal edge to the second sheet metal part by means of a thermal or mechanical joint, in particular, a laser welding process, the first and the second process steps taking place within a production line.

What this means according to the present invention is that all the connection steps necessary for the provision of a sheet metal blank are realized within a single production line. According to the underlying concept of the method, it makes no difference whether the first and the second sheet metal part originate from different groups of materials or belong to a single group of materials. The connection of the sheet metal parts within the production line (in-line) permits greater cost-efficiency, since handling apparatuses and the time associated therewith in conjunction with handling no longer apply.

In an advantageous further development, it is proposed that at least the first sheet metal part and/or the connecting sheet metal strip are supplied to the production line as an endless strip (coil) and are connected to one another with a continuous feed or with a synchronized feed.

The supply as an endless strip, generally referred to as a "coil", offers the advantage that handling operations, separation operations and stacking devices are again no longer necessary. In addition, both a continuous feed can be realized, for example, by the arrangement of a strip storage device ("loop" or the like), for example, when changing the coil, or a synchronized mode of operation may be preferred. The latter, synchronized mode of operation is particularly appropriate when separation operations or stacking operations must be undertaken, in which the resulting sheet metal blanks must remain in a single position.

According to the previous example, it is further proposed advantageously that the second sheet metal part is supplied to the production line as an endless strip (coil) and is connected to the connecting sheet metal strip with a continuous feed or with a synchronized feed.

An appropriate embodiment of the method for manufacturing hybrid sheet metal blanks is characterized in that the second sheet metal part material is a different sheet metal part material from a different group of materials than the first sheet metal part material and is not able to be connected to it directly by a thermal joint, the connecting sheet metal strip being configured as a hybrid connecting sheet metal strip having a first wing made of a material capable of being connected to the first sheet metal part material by means of a thermal joint and a second wing made of a material capable of being connected to the second sheet metal part material by means of a thermal joint, and, in a single process step, the first sheet metal part being connected to the first wing of the hybrid connecting sheet metal strip and/or the second sheet metal part being connected to the second wing of the hybrid connecting sheet metal strip respectively by a thermal joint, in particular, by laser welding.

The connection of two sheet metal parts from different groups of materials by means of a hybrid connecting sheet metal strip is thus made possible within a single production line, the hybrid connecting sheet metal strip exhibiting wings made from the corresponding group of materials in each case, which wings are capable of being connected to the respective groups of materials of the sheet metal parts by means of a thermal joint, in particular by laser welding. In this way, hybrid sheet metal blanks can be manufactured with sections of different groups of materials in a continuous production process.

A further development of the method proposes that, in one process step, the first sheet metal part is connected with a butt joint to the first wing of the hybrid connecting sheet metal strip, and in that, in a following process step, the second sheet metal part is connected with a butt joint to the second wing of the hybrid connecting sheet metal strip.

Connections with a butt joint offer the advantage that no additional application of material takes place in the sheet material thickness of the resulting part and the further processing of the sheet metal blanks is not hindered thereby.

As an alternative, one embodiment of the invention proposes that the first sheet metal part, in one process step, is connected with an overlap to the first wing of the hybrid connecting sheet metal strip, and in that the second sheet metal part, in a subsequent process step, is connected with an overlap to the second wing of the hybrid connecting sheet metal strip.

Connections with an overlap offer the advantage that simplified manufacturing can be used, in particular when there is a requirement to introduce reduced costs into the component positioning and/or the edge preparation.

In a further development it is proposed, furthermore, that the first or the second sheet metal part is connected with a butt joint to the hybrid connecting sheet metal strip, and in that the other of the two sheet metal parts is connected with an overlap to the hybrid connecting sheet metal strip.

The advantages described above are combined in this way, and are united within a single sheet metal blank.

An additional advantage derives from the fact that the connecting sheet metal strip is manufactured in a preceding process step from at least two wing strips, the manufacture taking place in particular in a thermal jointing process and/or a mechanical forming process within the production line.

As soon as the connecting sheet metal strip has been manufactured and processed within the same production line, the production line is a fully closed production line starting from the raw material, preferably in the form of endless strips (coils), which delivers the sheet metal blanks or the hybrid sheet metal blanks as the product, without the need to perform intermediate processes and/or handling operations.

In particular, it is proposed, preferably, that at least one sheet metal part and/or the connecting sheet metal strip is subjected to processing, in particular edge processing, ablation, cutting, forming or notching, within the production line before or after the execution of a thermal or mechanical joint.

Edge processing for the purpose of preparing the thermal joint or processing of the other edges (cutting to size), or of the surface of the individual parts to be connected together, further augment the production depth of the production line and increase the efficiency of the method according to the invention.

A further development in addition proposes that the first and/or the second sheet metal part are connected to the connecting sheet metal strip, and in that the resulting endless metal sheet is then parted within the production line in such a way that an individual sheet metal blank resulting herefrom comprises at least one first sheet metal part section, at least one second sheet metal part section and a connecting sheet metal strip section connecting these sheet metal part sections.

The resulting blanks can be made available for the next processing operation (forming, coating, . . . ), where applicable with the additional application of stacking beads or the like. This decoiling also makes it possible to make available sheet metal blanks, which may possibly no longer be capable of being coiled or presented in some other way, for example, due to the absence of flexibility or because of the structure produced in the surface of the sheet metal blanks.

The expression "a group of materials" is used in the context of the invention to denote a group of materials, between which a thermal joint can be produced without problem. In this respect, for example, steel alloys thus constitute a group of materials, or aluminum alloys constitute a group of materials.

The expression "a sheet metal part" is used in the context of the invention to denote a sheet metal blank or an endless metal sheet or a sheet metal strip (coil). According to one particular variant embodiment, the expression "a sheet metal part" used in the context of the invention is also understood to denote a formed and, in particular, a deep-drawn sheet metal blank, or a sheet metal blank or a sheet metal strip, which already exhibit recesses or notches produced by previous process steps.

BRIEF DESCRIPTION OF THE DRAWINGS

Further details of the present invention are described in the drawing on the basis of schematically represented illustrative embodiments. However, the invention is not restricted to the illustrative embodiments.

FIG. 1 depicts a schematic representation of a production line with endless sheet metal strips from the same group of materials.

FIG. 2 depicts a schematic representation of a production line with endless sheet metal strips from different groups of materials and a hybrid connecting sheet metal strip.

DETAILED DESCRIPTION OF THE INVENTION

Figure 3A:
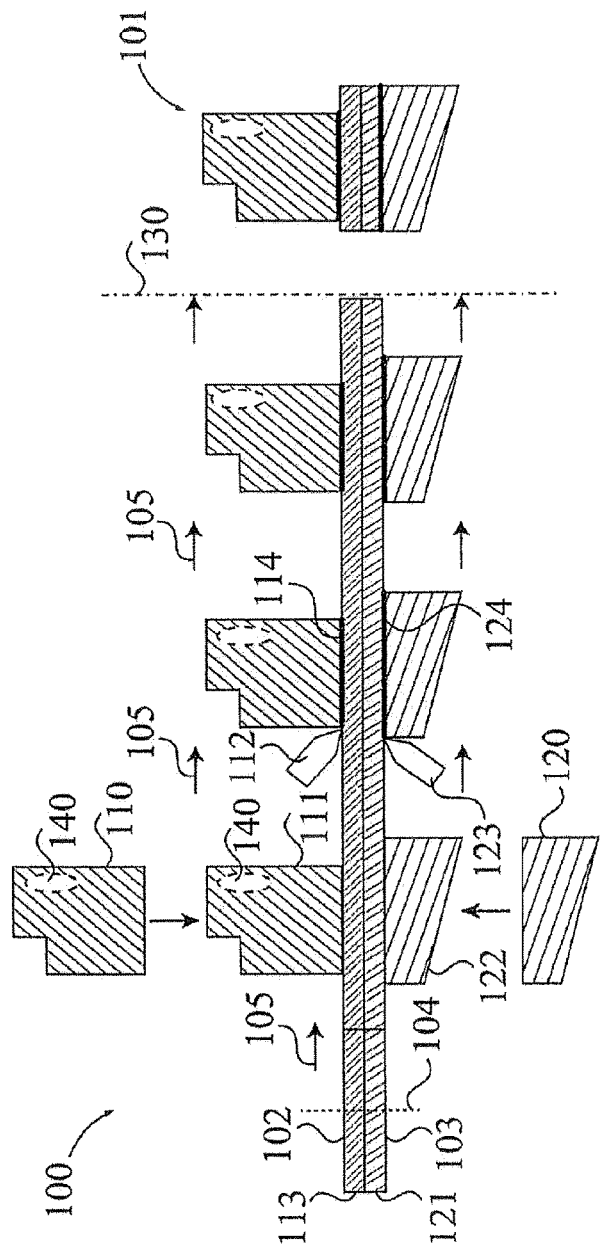
FIG. 3a depicts a schematic representation of a production line with a hybrid connecting sheet metal strip and, applied thereto, sheet metal parts from different groups of materials.

FIG. 1 depicts in detail a production line 1, in which the materials are supplied in the form of endless strips (coils). The connecting sheet metal strip 2 is made available as a coil 3 on an axis 4, and is supplied from there to the production line in the direction of feed 5. The first sheet metal part 6 is likewise supplied to the production line 1 in the form of a sheet metal strip from a coil 7, and is wound around an axis 8, in a direction of feed 9 arranged parallel to the direction of feed 5. Accordingly, the second sheet metal part 10 in the form of a sheet metal strip is also supplied from a coil 11 around an axis 12 in the direction of feed 13. Continuing in the direction of feed 5, 9, 13 and arranged after the coils 3, 7, 11, are laser welding heads 14 and 15, which produce the welding seam 16, 17 for making the sheet metal blank available. The laser welding head 14 in this case connects the first sheet metal part 6 to the connecting sheet metal strip 2, in the present case in a continuous feed with the welding seam 16. The laser welding head 15 accordingly connects the second sheet metal part 10 to the connecting sheet metal strip 2 in order to make the welding seam 17 available. Arranged downstream of the connection step in the production line 1 is a decoiling station 20, which then makes the resulting sheet metal blank 21 available as an individual component. A strip storage device ("loop"), which permits synchronized decoiling, may possibly be located upstream of the decoiling station 20, although this is not represented in the present case, without the requirement for the continuous manufacturing of the welding seam 16, 17 to be similarly synchronized. Other suitable arrangements of known strip storage devices, for example after the coils have been made available, are also conceivable.

FIG. 2 depicts an alternative embodiment of a production line 30 corresponding to the production line in FIG. 1, in which the connecting sheet metal strip 31 is now proposed as a hybrid connecting sheet metal strip. The first sheet metal part material 32 and the second sheet metal part material 33 now consist of materials from different groups of materials and are supplied to the production line 30. The supply takes place accordingly via coils 34 and 35. The hybrid connecting sheet metal strip 31 is supplied to the production line 30 via a coil 36.

The hybrid connecting sheet metal strip 31 has a first wing 40 and a second wing 41, each of which consists of materials from different groups of materials. The material group of the first wing 40 corresponds to a material group of the sheet metal part 32 and is thus capable of being connected to the first sheet metal part 32 by means of a first laser welding head 50 for making available a first welding seam 53, while making available a thermal joint. Correspondingly, the material group of the second wing 41 of the connecting sheet metal strip 31 of the material group of the second sheet metal part 33 is selected accordingly, so that the second welding seam 52 can be made available by means of the second laser welding head 51.

Decoiling 45 for the purpose of making available a hybrid sheet metal blank 46, which can then be supplied for further processing, also takes place in the region of the production line 30 according to FIG. 2.

In a preferred, although only schematically represented embodiment, it is proposed that at least one sheet metal part 32 or 33, although also, where appropriate, both sheet metal parts and/or the hybrid connecting sheet metal strip, may have undergone previous processing operations. Recesses 48 may be provided in this case, for example. Edge processing, cutting to size or other processing possibilities are also conceivable.

FIG. 3a depicts a further embodiment of a production line 100 according to the invention for making available a hybrid sheet metal blank 101. The production line 100 has at its center a hybrid connecting sheet metal strip 102, which is supplied as an endless strip in the form of a coil 103 on an axis 104 of the installation in the direction of feed 105.

A first sheet metal part 110 made of a metal sheet from a first group of materials is supplied to the production line 100, furthermore, and is arranged on the connecting sheet metal strip 102. The arranged first sheet metal part 111 is then displaced in the direction of feed 105 to a first laser welding head 112, which connects the first sheet metal part 111 to a first wing 113 of the hybrid connecting sheet metal strip 102 by means of a first welding seam 114. The first wing 113 of the hybrid connecting sheet metal strip 102 in this case corresponds to the group of materials of the first sheet metal part 110, 111, so that a thermal joint in the form of a laser-welded joint is made possible.

The second sheet metal part 120 is arranged correspondingly on a second wing 121 of the hybrid connecting sheet metal strip 102. The arranged second sheet metal part 122 is then supplied accordingly in the direction of feed 105 to a second laser welding head 123, which produces a welding seam 124 between the second wing 121 of the hybrid connecting sheet metal strip 102 and the arranged second sheet metal part 122. Continuing in the direction of feed 105, decoiling 130 according to the description of the above Figures is then also undertaken, as a result of which the hybrid blank 101 is made available individually. Here, too, a possible strip storage device is not represented in the present case.

It is also depicted by way of example in FIG. 3a, although not exclusively or restrictively, that a recess 140 or processing of some other kind may be proposed, for example, in the first sheet metal part 110, 111. The geometry of the edge line outside the welding seam 114, 124 of the first sheet metal part 110 and/or of the second sheet metal part 120 can also be freely selected for processing in the production line 100.

Figure 3B:
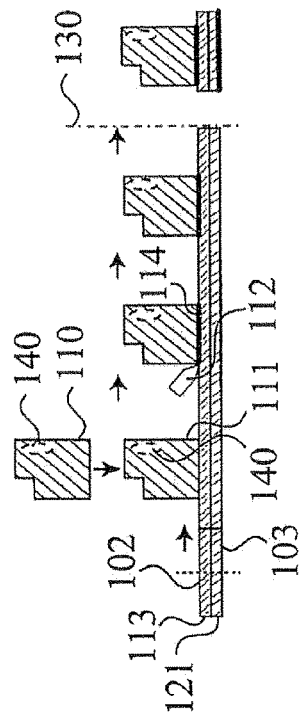
FIG. 3b depicts a variant of the production line according to FIG. 3a, in which sheet metal parts are applied on one side only.

Represented in FIG. 3b is an alternative illustrative embodiment of the production line according to FIG. 3a, which positions sheet metal parts 110, 111 on one side only. Identical components are provided with identical reference designations to those in FIG. 3a. Reference is made to the above description.

Various embodiments of the connections of sheet metal parts to the connecting sheet metal strip are represented in FIGS. 4a, 4b, 4c and 4d.

Figure 4A:
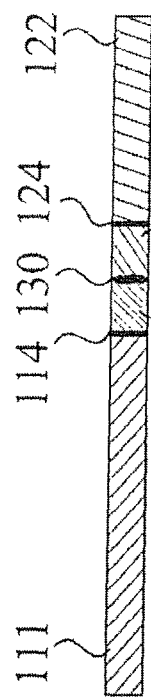
FIGS. 4a, 4b, 4c and 4d depict sectioned views through resulting hybrid sheet metal blanks in order to illustrate the resulting connections.

FIG. 4a depicts a thermal joint in the form of welded seams 114 and 124 of a first sheet metal part 111 positioned with a butt joint on a first wing 113 of a hybrid connecting sheet metal strip 102, and of a second sheet metal part 122 on a second wing 121 of the connecting sheet metal strip 102. The connecting sheet metal strip in this case is likewise produced by means of a fusible joint 130 from the materials of different groups of materials and, where appropriate, is formed into the resulting longitudinal strip by a roll-cladding process.

Figure 4B:
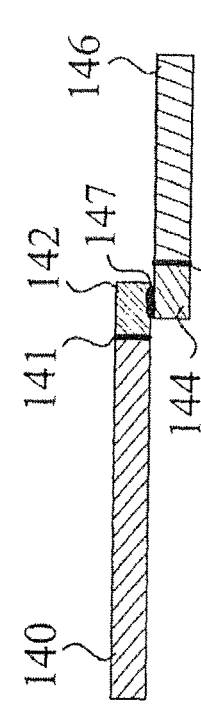

FIG. 4b depicts a variant of the connection of the first sheet metal part 140 with a butt joint by means of a welded seam 141 to a first wing 142 of a hybrid connecting sheet metal strip 143. The second wing 144 of the connecting sheet metal strip 143 is in turn attached with a butt joint to a second sheet metal part 146 by means of a welded seam 145. The hybrid connecting sheet metal strip 143 in this case is manufactured as the overlap between two wing strips 142 and 144, and these are connected to one another by means of a fusible joint 147. A mechanical joint, such as a positively locking deformable joint, a crimped joint or a riveted joint, can be proposed as an alternative to the fusible joint.

Figure 4C:
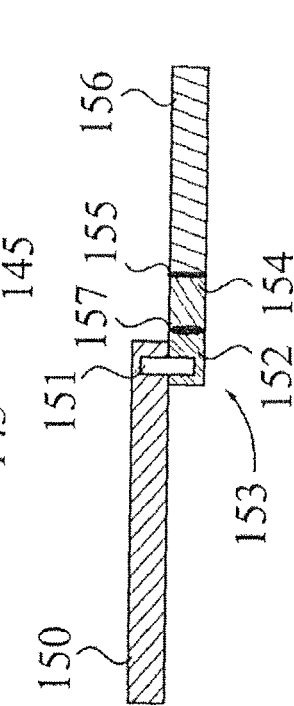

FIG. 4c depicts a variant of the connection of the first sheet metal part 150 to a first wing 152 of a first hybrid connecting sheet metal strip 153 with an overlap by means of a mechanical joint 151, such as a positively locking deformable joint, a crimped joint or a riveted joint. The second wing 154 of the connecting sheet metal strip 153 is in turn attached with a butt joint to a second sheet metal part 156 by means of a welded seam 155. The hybrid connecting sheet metal strip 153 in this case is embodied according to FIG. 4a. It will be obvious to a person skilled in the art that the second sheet metal part 156 could also be similarly mechanically attached.

Figure 4D:
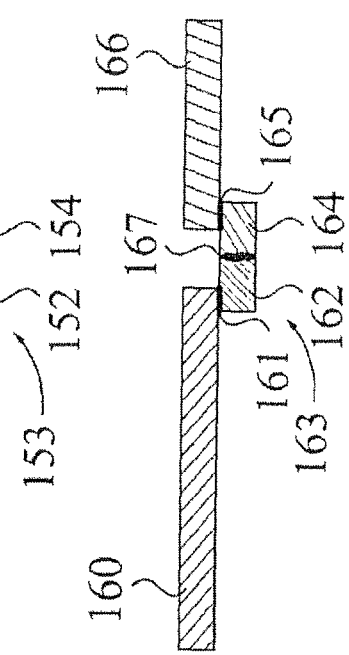

FIG. 4d depicts a thermal joint attached with an overlap in the form of welded seams 161 and 165 of a first sheet metal part 160 on a first wing 162 of a hybrid connecting sheet metal strip 163, and of a second sheet metal part 166 on a second wing 164 of the connecting sheet metal strip 163. The connecting sheet metal strip in this case is likewise produced by means of a fusible joint 167 from the materials of different groups of materials and, where appropriate, is formed into the resulting longitudinal strip by a roll-cladding process.

It is clear, furthermore, that the variants in FIGS. 4a to 4d are also universally applicable. The advantage according to the invention is achieved by the manufacture of the connections concerned within a production line.

LIST OF REFERENCE DESIGNATIONS 1 production line
2 connecting sheet metal strip
3 coil
4 axis
5 direction of feed
6 first sheet metal part
7 coil
8 axis
9 direction of feed
10 second sheet metal part
11 coil
12 axis
13 direction of feed
14 laser welding head
15 laser welding head
16 welding seam
17 welding seam
20 decoiling station
21 sheet metal blank
30 production line
31 connecting sheet metal strip
32 first sheet metal part material
33 second sheet metal part material
34 coil
35 coil
36 coil
40 first wing
41 second wing
45 decoiling station
46 hybrid sheet metal blank
48 recesses
50 first laser welding head
52 second welding seam
53 first welding seam
100 production line
101 hybrid sheet metal blank
102 connecting sheet metal strip
103 coil
104 axis
105 direction of feed
110 sheet metal part
112 laser welding head
113 first wing
114 first welding seam
120 second sheet metal part
121 second wing
122 second sheet metal part
123 second laser welding head
124 welding seam
130 fusible joint
140 first sheet metal part
141 welding seam
142 first wing
143 hybrid connecting sheet metal strip
144 second wing
145 welding seam
146 second sheet metal part
147 fusible joint
150 first sheet metal part
151 welding seam
152 first wing
153 hybrid connecting sheet metal strip
154 second wing
155 welding seam
156 second sheet metal part
157 fusible joint
160 first sheet metal part
161 welding seam
162 first wing
163 hybrid connecting sheet metal strip
164 second wing
165 welding seam
166 second sheet metal part
167 fusible joint

The invention claimed is:

1. A method for manufacturing sheet metal blanks comprising:
supplying a first sheet metal part manufactured from a first sheet metal part material to a production line,
supplying a second sheet metal part manufactured from a second sheet metal part material to the production line,
supplying an elongate connecting sheet metal strip manufactured in a previous process step from at least two wing strips, the connecting sheet metal strip is manufactured in a thermal jointing process and/or a mechanical forming process within the production line,
connecting in a first process step, the connecting sheet metal strip along a first longitudinal edge to the first sheet metal part, and
connecting in a second process step, the connecting sheet metal strip along a second longitudinal edge to the second sheet metal part, wherein,
in the first process step, the connecting sheet metal strip is connected along the first longitudinal edge to the first sheet metal part by means of a thermal or mechanical joint, and
in the second process step, the connecting sheet metal strip is connected along the second longitudinal edge to the second sheet metal part by means of a thermal or mechanical joint,
the first and the second process steps taking place within the production line.

2. The method according to claim 1, wherein the first sheet metal part and/or the connecting sheet metal strip are supplied to the production line as an endless strip (coil) and are connected to one another with a continuous feed or with a synchronized feed.

3. The method according to claim 2, wherein the second sheet metal part is supplied to the production line as an endless strip (coil) and is connected to the connecting strip with a continuous feed or with a synchronized feed.

4. The method according to claim 1, wherein
the second sheet metal part material is a sheet metal part material other than the first sheet metal part material and is not able to be connected directly thereto by a thermal joint,
the connecting sheet metal strip being configured as a hybrid connecting sheet metal strip having a first wing made of a material capable of being connected to the first sheet metal part material by means of a thermal joint and a second wing made of a material capable of being connected to the second sheet metal part material by means of a thermal joint, and
in a single process step, the first sheet metal part being connected to the first wing of the hybrid connecting sheet metal strip and/or the second sheet metal part being connected to the second wing of the hybrid connecting sheet metal strip respectively by a thermal joint.

5. The method according to claim 1, wherein in one process step, the first sheet metal part is connected with a butt joint to a first wing of a hybrid connecting sheet metal strip, and wherein in a following process step, the second sheet metal part is connected with a butt joint to a second wing of the hybrid connecting sheet metal strip.

6. The method according to claim 1, wherein the first sheet metal part, in one process step, is connected with an overlap to a first wing of a hybrid connecting sheet metal strip, and in that the second sheet metal part, in a subsequent process step, is connected with an overlap to a second wing of the hybrid connecting sheet metal strip.

7. The method according to claim 1, wherein the first or the second sheet metal part is connected with a butt joint to a hybrid connecting sheet metal strip, and in that the other of the two sheet metal parts is connected with an overlap to the hybrid connecting sheet metal strip.

8. The method according to claim 1, wherein at least one sheet metal part and/or the connecting sheet metal strip is subjected to at least one of edge processing, ablation, cutting, forming and notching, within the production line before or after the execution of a thermal or mechanical joint.

9. The method according to claim 1, wherein the first and/or the second sheet metal part are connected to the connecting sheet metal strip, and wherein a resulting endless metal sheet is then parted within the production line in such a way that an individual sheet metal blank resulting herefrom comprises at least one first sheet metal part section, at least one second sheet metal part section and a connecting sheet metal strip section connecting these sheet metal part sections.

10. The method according to claim 1, wherein the sheet metal blanks are hybrid sheet metal blanks.

11. The method according to claim 1, wherein in the first process step, the means of the thermal or mechanical joint is a laser welding process.

12. The method according to claim 1, wherein in the second process step, the means of the thermal or mechanical joint is a laser welding process.

13. The method according to claim 4, wherein in the single process step, the thermal joint is produced by laser welding, respectively.

* * * * *